(12) United States Patent
Constantinescu

(10) Patent No.: US 8,370,775 B2
(45) Date of Patent: Feb. 5, 2013

(54) DETERMINING A PREDICTED SOFT ERROR RATE FOR AN INTEGRATED CIRCUIT DEVICE DESIGN

(75) Inventor: Cristian Constantinescu, Fort Collins, CO (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 376 days.

(21) Appl. No.: 12/698,351

(22) Filed: Feb. 2, 2010

(65) Prior Publication Data

US 2011/0191741 A1 Aug. 4, 2011

(51) Int. Cl.
*G06F 17/50* (2006.01)
(52) U.S. Cl. ............................ 716/101; 716/55; 716/132
(58) Field of Classification Search .................... 716/55, 716/101, 132
See application file for complete search history.

(56) References Cited

U.S. PATENT DOCUMENTS

2006/0150128 A1* 7/2006 Zhu et al. ........................... 716/4

OTHER PUBLICATIONS

P.C. Murley et al., "Soft-Error Monte Carlo Modeling Program, SEMM," IBM J. Res. Develop. vol. 40, No. 1, Jan. 1996, pp. 109-118.

\* cited by examiner

*Primary Examiner* — Thuan Do

(57) ABSTRACT

A method for determining a predicted soft error rate (SER) for an integrated circuit device design includes calculating the SER based on a predicted amount of charge imparted by a one or more particles to the integrated circuit device based on the design. The SER is further based on a predicted sensitivity level of a region of the integrated circuit device to the charge imparted by the one or more particles, and can also be based on the energy spectrum of the particles.

20 Claims, 4 Drawing Sheets

US 8,370,775 B2

DETERMINING A PREDICTED SOFT ERROR RATE FOR AN INTEGRATED CIRCUIT DEVICE DESIGN

FIELD OF THE DISCLOSURE

The present disclosure generally relates to integrated circuit design and more particularly relates to determining a predicted soft error rate (SER) for an integrated circuit device.

BACKGROUND

Energetic particles that strike the integrated circuit device can deposit an electric charge which alters a logic state at the device. For example, data stored in a Static Random Access Memory (SRAM) may be altered as a transistor switches from non-conductive to conductive state due to a particle strike. Energetic particles interacting with the device can also induce electric pulses in combinational logic of an integrated circuit device. These pulses can alter the logic state of data stored at storage elements connected to the combinational logic. Deposition of charge from a particle that results in alteration of a logic state and similar events are referred to as Single Event Upsets (SEU). SEUs often generate soft errors, which are errors that can result in alteration of a logic state but typically do not result in permanent damage of the integrated circuit device.

DESCRIPTION OF THE DRAWINGS

FIGS. 1-6 illustrate a system and method for determining a soft error rate (SER) for an integrated circuit device design. The method includes calculating the SER based on a predicted amount of charge imparted by a theoretical one or more particles to the integrated circuit device based on the design. The SER is further based on a predicted sensitivity level of a region of the integrated circuit device to the charge imparted by the one or more particles, and is also based on the predicted energy spectrum of the particles. By basing the SER on this information, the need to run extensive simulations on the device design is reduced. Further, the accuracy of the SER is enhanced, allowing the integrated circuit device design to be refined to meet a target SER threshold.

Figure 1:
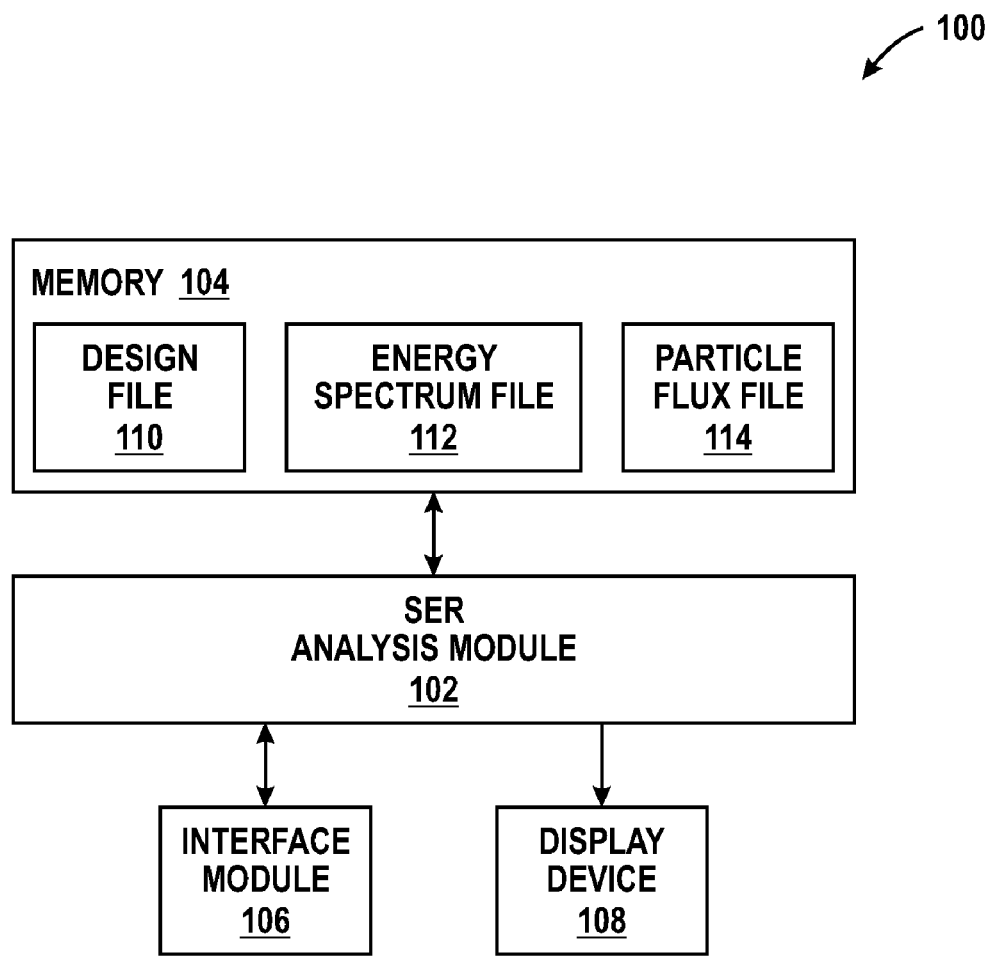
FIG. 1 is a block diagram of a design analysis system in accordance with one embodiment of the present disclosure.
Figure 2:
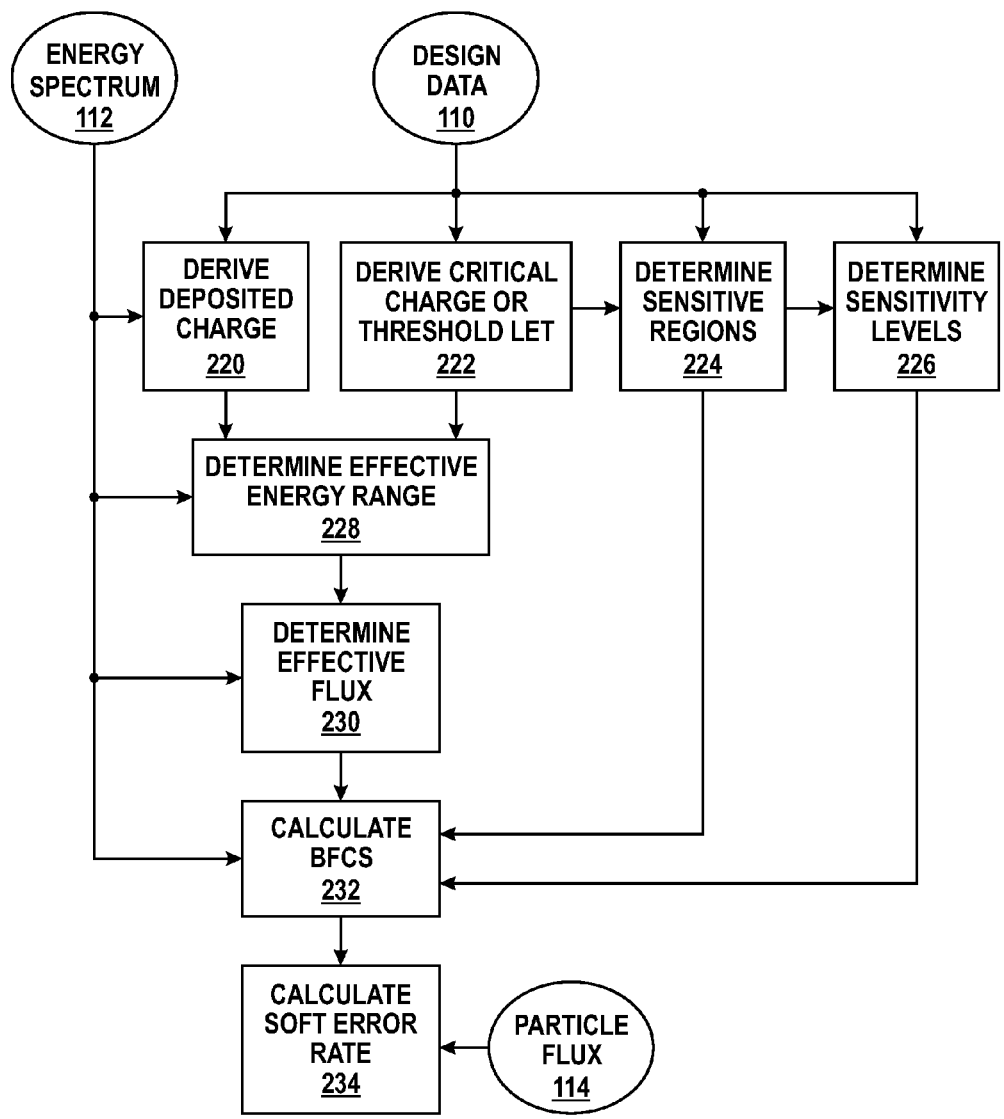
FIG. 2 is a block diagram of a method of determining a soft error rate in accordance with one embodiment of the present disclosure.
Figure 3:
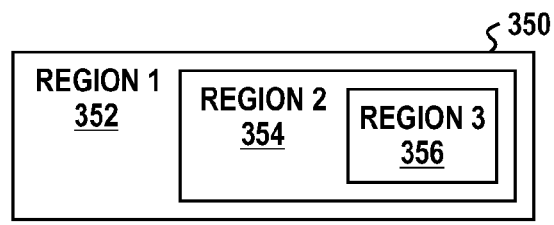
FIG. 3 is a block diagram of an integrated circuit device having regions with different sensitivity levels in accordance with one embodiment of the present disclosure.

FIG. 1 illustrates a block diagram of a design analysis system 100 in accordance with one embodiment of the present disclosure. In an embodiment, the design analysis system 100 is a computer device generally configured to perform analysis operations for an integrated circuit device design, including determination of an SER for the design. The design analysis system 100 can also perform other analysis operations, such as circuit simulations, process simulations, device modeling, and the like. Further, the design analysis system 100 can also include, or be integrated with, design tools to adjust the integrated circuit device design based on the determined SER for the design.

The design analysis system 100 is configured to perform its analysis operations for an integrated circuit device design. As used herein, an "integrated circuit device" refers to a physical device, while an "integrated circuit device design" refers to information used to create the physical device. The integrated circuit device design can be reflected in a variety of informational formats, such as netlists, circuit layouts and schematics, process information, and the like, and any combination thereof. It will be appreciated that an SER for an integrated circuit device design can be determined based on the design, on an integrated circuit device created based on the design, or a combination thereof.

Design analysis system 100 includes an SER analysis module 102 connected to a memory 104, an interface module 106, and a display device 108. Interface module 106 is configured to provide an interface for a user to interact with the design analysis system 100. Accordingly, the interface module 106 can include one or more interface devices, such as a keyboard, mouse, touch screen, or the like. Display device 108 is a device configured to display information for the user, such as a computer display, a touch screen, or the like.

Memory 104 is a storage device configured to store digital information. Accordingly, memory 104 can be a random access memory (RAM), a non-volatile memory, such as a flash memory or a hard drive, or the like. In the illustrated embodiment, memory 104 stores a design file 110, an energy spectrum file 112, and a particle flux file 114. The design file 110 includes information representing an integrated circuit design. Thus, design file 110 can include one or more netlists, circuit schematic information, circuit layout information, material density information, process information, doping profiles, and the like, or any combination thereof, that reflect at least a portion of the integrated circuit device design. It will be appreciated that although design file 110 is illustrated as a single file of information, in other embodiments the design information can be stored in multiple files or other storage configurations.

Energy spectrum file 112 includes information representing the energy spectrum of a set of particles that can potentially interact with the integrated circuit device represent by the integrated circuit device design. A particle interacts with a device when it physically affects the device. For example, a particle can interact with a device by physically striking the device and imparting some electrical charge to a region of the device.

Figure 4:
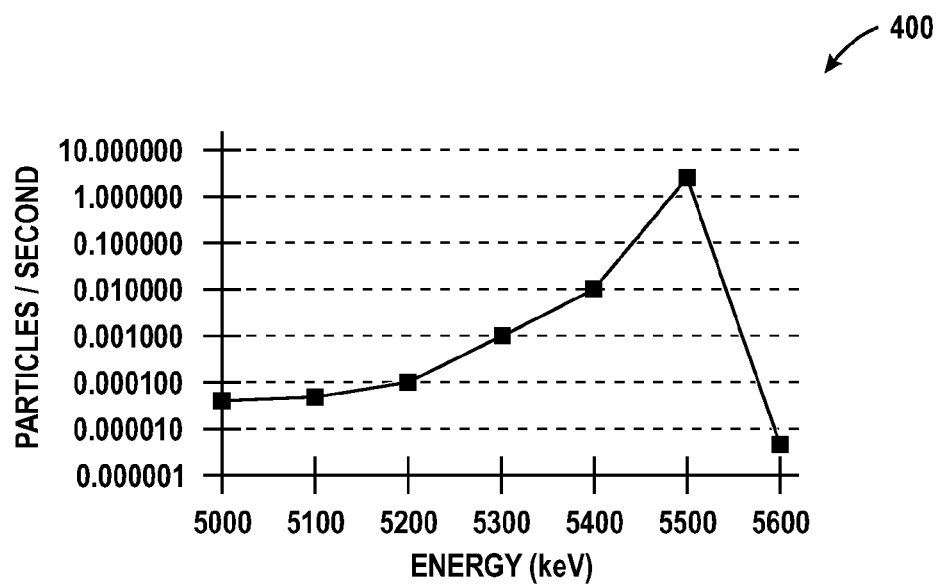
FIG. 4 is a diagram illustrating an energy spectrum associated with a set of particles predicted to strike an integrated circuit device in accordance with one embodiment of the present disclosure.
Figure 5:
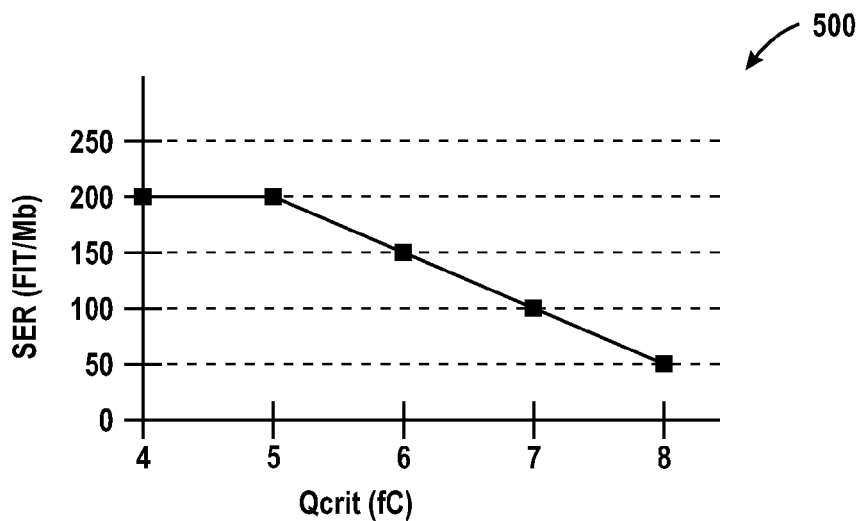
FIG. 5 is a diagram illustrating a range of SER values for an integrated circuit device in accordance with one embodiment of the present disclosure.

In an embodiment, the energy spectrum information is stored at energy spectrum file 112 as one or more values, with each value indicating the number of particles within a particular energy level that are predicted to interact with the integrated circuit device in a designated amount of time. An example energy spectrum is illustrated at FIG. 4, which depicts a graph 400. The abscissa of graph 400 indicates an energy level, while the ordinate indicates a number of particles per second predicted to interact with the integrated circuit device. Thus, each point of graph 400 indicates a predicted number of particles having the energy level associated with the point expected to interact with the integrated circuit device each second. The energy spectrum represented by energy spectrum file 112 can be based on theoretical predictions of the energy spectrum, or based on measurements of a test device. The measurements can be taken using a radiation counter and a radiation source. The radiation source emits particles at the different energy levels of interest, and the radiation counter indicates the number of particles at each energy level likely to reach the integrated circuit device. The energy spectrum file 112 can be developed based on the information provided by the radiation counter.

Particle flux file 114 stores information indicating the flux of energetic particles for a particular material associated with the integrated circuit device design. For example, the particle flux file 114 can indicate the predicted or measured flux of the materials to be used to form all or part of the integrated circuit device. In an embodiment, the particle flux is a value indicating the number of particles emitted by a material over a given area over a given amount of time. In contrast, the energy spectrum file 112 indicates the relation between the number of particles per unit of time and the relative energy of the particles.

SER analysis module 102 is configured to determine the SER for an integrated circuit device design. Accordingly, SER analysis module 102 can be a general purpose or application specific processor device operable to execute a set of instructions to determine the SER. In an embodiment, SER analysis module 102 is a general purpose processor that can be configured to perform other design analysis operations, such as process simulations, circuit simulations, or the like.

In operation, the SER analysis module 102 receives a request, via interface module 106, to determine the SER for an integrated circuit device design represented by design file 110. In response, SER analysis module 102 accesses the memory 104 to retrieve design file 110, energy spectrum file 112, and particle flux file 114, and determines the SER based on the information in these files. This can be better understood with reference to FIG. 2, which illustrates a flow diagram of a method of calculating an SER for the integrated circuit device design in accordance with one embodiment of the present disclosure. In the illustrated embodiment, at block 220 SER analysis module 102 derives the amount of charge predicted to be deposited at the integrated circuit by each energetic particle represented by the energy spectrum file 112 based on the design file 110. In an embodiment, the amount of deposited charge for a particular particle is based on the amount of energy loss of the particle resulting from traversing or impacting the constituent materials of the integrated circuit device, and by determining the distribution of charge likely to result from the particle interacting with the device. These values can be determined using standardized tools, such as Synopsys® Sentaurus, or standardized stopping power and range tables for different types of particles. For example, ASTAR information can be employed for alpha particles, while SRIM information can be used to determine stopping power and range of ions in matter.

At block 222, the SER analysis module 102 determines the critical charge level that will cause the minimum electron charge disturbance resulting in a change in the logic state of a data value at the integrated circuit device. As used herein, a change in the logic state of a data value can refer to the change in a stored data value at a memory, latch, or other storage element of the integrated circuit device, or a change in a logic state represented by a signal at the integrated circuit device. The critical charge level can be determined using Synopsys® Sentaurus, Simulation Program with Integrated Circuit Emphasis (SPICE) or other circuit simulations, or other software tools.

At block 224, the SER analysis module 102 determines the distribution of sensitivity regions of the integrated circuit device. In particular, due to differences in materials, circuit layout, and the like, different regions of the integrated circuit device can have different sensitivities to interaction with particles, such that interaction of a particle at one region is likely to result in deposition of more charge at that region than a different region. This can be better understood with reference to FIG. 3, which illustrates the sensitive regions of an integrated circuit device 350 in accordance with one embodiment of the present disclosure. Integrated circuit device 350 includes regions 352, 354, and 356, with each region having a different sensitivity to interaction with energetic particles. For example, region 356 can be more sensitive to particle interaction than region 354, such that a particle interacting with region 356 is likely to result in more charge being transferred than the particle interacting with region 354. Returning to FIG. 2, at block 226 the SER analysis module 102 determines the sensitivity value associated with each region. In an embodiment, the sensitivity values are normalized to fractional values between 0 and 1, with higher values indicating higher sensitivity to interaction with an energetic particle. The distribution of each sensitivity region and the associated sensitivity values can be determined via simulation with a tool such as Synopsys® Sentaurus, or by physical testing of an integrated circuit device created in accordance with the integrated circuit device design.

At block 228, the SER analysis module 102 determines an effective energy range based on the critical charge level and the deposited charge determined at block 220. The effective energy range is the range of energy of the energetic particles which are able to change the state of a data value at the integrated circuit device when interacting with the device. In an embodiment, the deposited charge is expressed as a function, referred to as f1, such that function f1 intersects the critical charge level twice. The two intersection points are referred to as the minimum energy level and maximum energy level of the particles. The effective energy range is the range between the minimum energy level and the maximum energy level. In another embodiment, such as when the critical charge is at a relatively low level, the function f1 may intersect the critical charge level only once. In that case, the intersection point corresponds to either the maximum or minimum energy level, while the other boundary corresponds to the minimum or maximum, respectively, of the range of energy associated with the energetic particles. For example, if the intersection point is at a relatively high energy level, this point is assigned as the maximum energy level for the effective energy range. In this case f1 may not intersect the critical charge at a lower energy, and the minimum energy of the range of energy for the energetic particles (as indicated by the energy spectrum information) is assigned as the minimum energy level for the effective energy range. Similarly, if the intersection point is at a relatively low energy level, this point is assigned as the minimum energy level for the effective energy range. In this case f1 may not intersect the critical charge at a higher energy, and the maximum energy of the range of energy for the energetic particles is assigned as the maximum energy level for the effective energy range. In still another embodiment, the function f1 does not intersect the critical charge level, and the minimum and maximum energy levels of the energetic particles correspond to the minimum energy level and maximum energy level for the effective energy range. In this case, each energetic particle is likely to change the logic state of a data value at the integrated circuit device when interacting with the device.

At block 230, the SER analysis module determines an effective flux for the integrated circuit device. The effective flux indicates the flux that is expected to change the state of a data value at the integrated circuit device when the device is exposed to a source of radiation characterized by the energy spectrum as represented by the energy spectrum file 112. In an embodiment, the energy spectrum is indicated by a function, referred to as f2, where f2 is a function of particle energy. The effective flux is determined by integrating the function f2 over the effective energy range determined at block 228. The effective flux thus is a fraction of the total flux of the energetic particles interacting with the integrated circuit device. In other words, the effective flux is the flux of particles with energies within the effective energy range.

At block 232 a bit fail cross section (BFCS) value is determined for the integrated circuit device. As used herein, a BFCS is a value that indicates the predicted sensitivity of an integrated circuit device to the flux of a set of particles. In an embodiment, the effective flux determined at block 230 is expressed as particles/(unit of time*unit of area) and the BFCS value is determined through a set of operations represented by the expression:

$$\frac{\sum_{i=1}^{N} \left( \begin{array}{c} \text{effective flux} * \text{area of } region_i * \\ \text{sensitivity level of } region_i \end{array} \right)}{\text{total particle flux}}$$

where N is the total number of regions having different sensitivity levels, as determined at block 224. Thus, calculation of the BFCS value includes determining a region value for each region by multiplying the effective flux, the area of the region, and the sensitivity level associated with the region. The region values are summed, and the sum is divided by the total particle flux as indicated by the energy spectrum file 112 to determine the BFCS.

At block 234, the SER analysis module 102 determines the SER for the integrated circuit device design based on the BFCS and the information provided by the particle flux file 214. In an embodiment, the SER is determined by multiplying the BFCS with the flux indicated by the particle flux file 214. This is the flux of a specific material or environment, having the same energy spectrum as set forth in the energy spectrum file 212. The SER can also be adjusted by multiplying the resulting value with a correction factor. For example, a correction factor may be used to indicate the source of energetic particles, such as solder bumps of the integrated circuit device, represent only a portion of the area of the device. The correction factor can indicate the percentage of device area covered by the particle emitting materials, such as the solder bumps. In addition, the SER can be scaled to express the SER in a desired set of units. For example, the SER can by multiplied by 10 to the ninth power, thereby expressing the SER as failures in time (FIT) per bit, where 1 FIT indicates 1 error every $10^9$ hours.

In an embodiment, the user of the design analysis system 100 can adjust the critical charge determined at block 222. The SER analysis module 102 can thereby be configured to express the SER over a range of critical charge values, allowing the user to analyze how changes in the integrated circuit device design will affect the SER. This can be better understood with reference to FIG. 5, which illustrates a graph 500. The abcissa of the graph 500 indicates the critical charge level, as expressed in femtocoulombs, while the ordinate of the graph 500 indicates the SER, as expressed in FIT per Megabit. The graph 500 thus indicates the variation in SER as the critical charge varies.

In addition, based on the SER results as determined by the SER analysis module 102, the design of the integrated circuit device can be adjusted so that the design satisfies an SER threshold. For example, if the SER analysis module 102 indicates the SER is above a specified threshold value, the user can adjust the integrated circuit design to increase the critical charge level, thereby adjusting the SER. The critical charge level of the design can be adjusted in a number of ways, such as by increasing the capacitance of particular devices in the integrated circuit device design.

Figure 6:
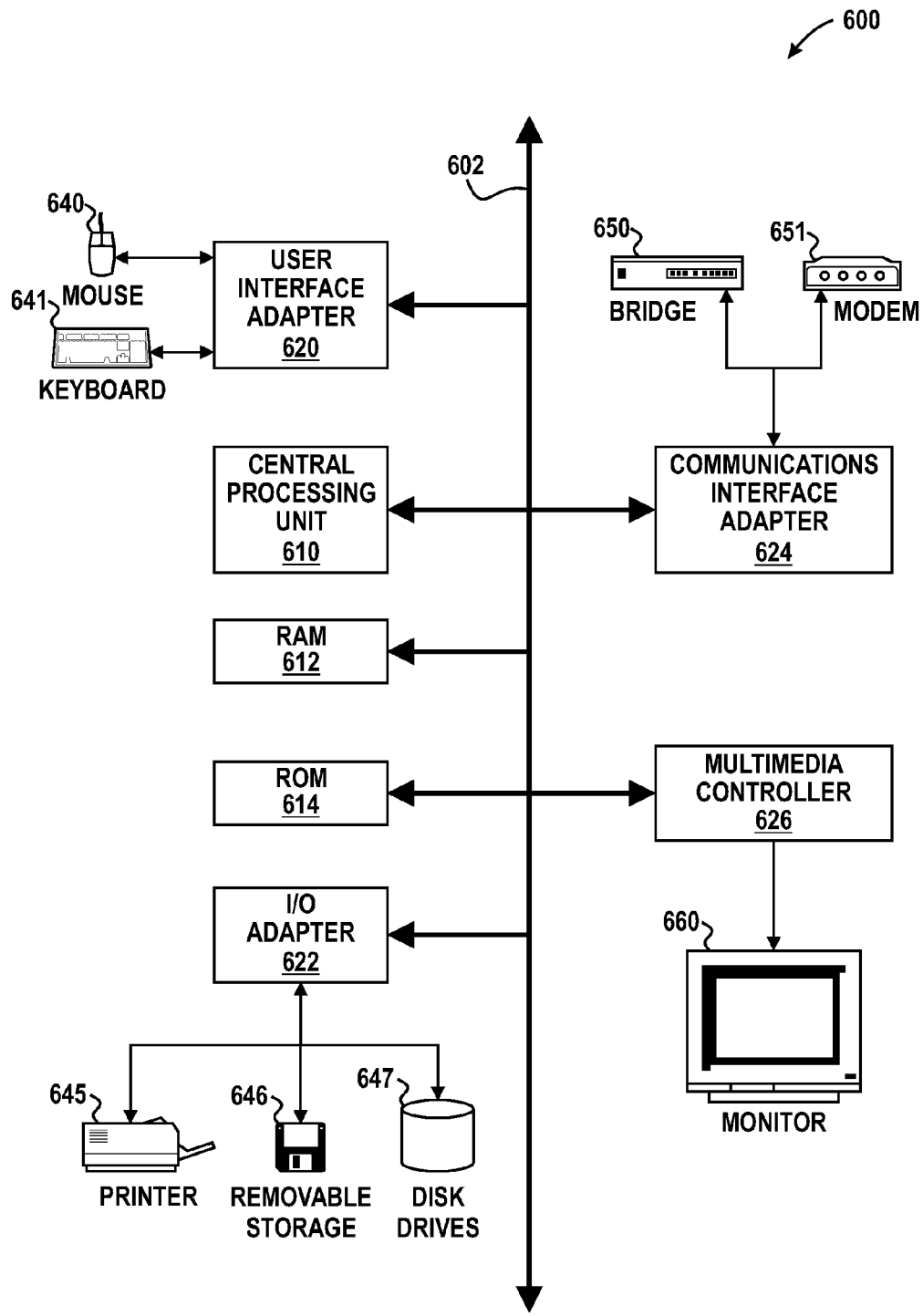
FIG. 6 is a block diagram of a computer device in accordance with one embodiment of the present disclosure.

FIG. 6 illustrates, in block diagram form, a processing device in the form of a computer system 600 in accordance with one embodiment of the present disclosure. The computer system 600 is illustrated to include a central processing unit 610, which may be a conventional proprietary data processor, memory including random access memory 612, read only memory 614, and input output adapter 622, a user interface adapter 620, a communications interface adapter 624, and a multimedia controller 626. The input output (I/O) adapter 622 is further connected to, and controls, disk drives 647, printer 645, removable storage devices 646, as well as other standard and proprietary I/O devices.

The user interface adapter 620 can be considered to be a specialized I/O adapter. The adapter 620 is illustrated to be connected to a mouse 640, and a keyboard 641. In addition, the user interface adapter 620 may be connected to other devices capable of providing various types of user control, such as touch screen devices. The communications interface adapter 624 is connected to a bridge 650 such as is associated with a local or a wide area network, and a modem 651. By connecting the system bus 602 to various communication devices, external access to information can be obtained. The multimedia controller 626 will generally include a video graphics controller capable of displaying images upon the monitor 660, as well as providing audio to external components (not illustrated).

Generally, the system 600 will be capable of implementing the system and methods described herein. For example, the RAM 612, ROM 614, and disk drives 647 are each computer readable media that can store a computer program including instructions to manipulate the central processing unit 610 to perform one or more of the methods described herein.

Other embodiments, uses, and advantages of the disclosure will be apparent to those skilled in the art from consideration of the specification and practice of the disclosure disclosed herein. It will further be appreciated that, although some circuit elements and modules are depicted and described as connected to other circuit elements, the illustrated elements may also be coupled via additional circuit elements, such as resistors, capacitors, transistors, and the like. The specification and drawings should be considered exemplary only, and the scope of the disclosure is accordingly intended to be limited only by the following claims and equivalents thereof.

What is claimed is:

1. A method, comprising:
   determining, at a processor device, a soft error rate (SER) for an integrated circuit device design based on a predicted amount of charge imparted by one or more particles to an integrated circuit device, based on a predicted sensitivity level of a first region of the integrated circuit device to charge imparted by the one or more particles, and based on a critical charge level representing an amount of charge predicted to change a logic state at the first region of the integrated circuit device.

2. The method of claim 1, further comprising:
   receiving design information based on the integrated circuit device design;

receiving energy spectrum information for the one or more particles; and determining the predicted amount of charge imparted by the one or more particles based on the design information and the energy spectrum information.

3. The method of claim 2, wherein determining the SER further comprises determining the SER based on predicted sensitivity levels for a plurality of regions of the integrated circuit device to charge imparted by the one or more particles.

4. The method of claim 3, wherein the plurality of regions comprises the first region and a second region, the first region associated with a first sensitivity level different from a second sensitivity level associated with the second region, such that more charge is predicted to be imparted to the first region by a first particle of the one or more particles than is predicted to be imparted to the second region by the first particle.

5. The method of claim 2, wherein determining the SER further comprises:

determining, based on the critical charge level, the energy spectrum information, and the predicted amount of charge imparted by the one or more particles, an energy range of the one or more particles that is predicted to change the logic state; and determining the SER further based on the energy range.

6. The method of claim 5, wherein determining the SER further comprises:

determining, based on the energy spectrum information and the energy range a flux of particles within the energy range; and determining the SER further based on the flux.

7. The method of claim 6, wherein determining the SER further comprises:

determining, based on the flux and the predicted sensitivity levels, a bit fail cross sectional (BFCS) value indicating a predicted sensitivity of the integrated circuit device to the flux; and determining the SER further based on the BFCS value.

8. The method of claim 7, wherein determining the BFCS value comprises:

determining a plurality of region values, each region value associated with a corresponding region of the integrated circuit device, each region value determined by:

determining, for the corresponding region, the area of the corresponding region;

multiplying the area with the effective flux associated with the corresponding region to determine an effective region value; and determining the region value by multiplying the effective region value with the predicted sensitivity level associated with the region; and summing the plurality of region values to determine the BFCS value.

9. The method of claim 7, wherein determining the SER further comprises:

determining a flux associated with a material to be implemented in the integrated circuit device; and determining the SER based on the flux associated with the material and the BFCS value.

10. A computer readable medium storing a set of instructions configured to manipulate a processor to:

determine a soft error rate (SER) for an integrated circuit device design based on a predicted amount of charge imparted by one or more particles to an integrated circuit device, based on a predicted sensitivity level of a first region of the integrated circuit device to charge imparted by the one or more particles, and based on a critical charge level representing amount of charge predicted to change a logic state at the first region of the integrated circuit device.

11. The computer readable medium of claim 10, wherein the set of instructions manipulate the processor to:

receive design information based on the integrated circuit device design;

receive energy spectrum information based on an energy spectrum of the one or more particles; and determine the predicted amount of charge imparted by the one or more particles based on the design information and the energy spectrum information.

12. The computer readable medium of claim 11, wherein the instructions to determine the SER comprise instructions to manipulate the processor to determine the SER based on predicted sensitivity levels for each of a plurality of regions of the integrated circuit device to charge imparted by the one or more particles.

13. The computer readable medium of claim 12, wherein the plurality of regions comprises the first region and a second region, the first region associated with a first sensitivity level different from a second sensitivity level associated with the second region, such that more charge is predicted to be imparted to the first region by a first particle of the one or more particles than is predicted to be imparted to the second region by the first particle.

14. The computer readable medium of claim 12, wherein the instructions to determine the SER comprise instructions to manipulate the processor to:

determine, based on the critical charge level, the energy spectrum information, and the predicted amount of charge imparted by the one or more particles, an energy range of the one or more particles that is predicted to change the logic state; and determine the SER based on the energy range.

15. The computer readable medium of claim 14, wherein the instructions to determine the SER comprise instructions to manipulate the processor to:

determine, based on the energy spectrum information and the energy range, a flux of particles within the energy range; and determine the SER based on the flux.

16. The computer readable medium of claim 15, wherein the instructions to determine the SER comprise instructions to manipulate the processor to:

determine, based on the flux and the predicted sensitivity levels, a bit fail cross sectional (BFCS) value indicating a predicted sensitivity of the integrated circuit device to the flux; and determine the SER based on the BFCS value.

17. The computer readable medium of claim 16, wherein the instructions to determine the BFCS value comprise instructions to manipulate the processor to:

determine a plurality of region values, each region value associated with a corresponding region of the integrated circuit device, each region value determined by:

determining, for each corresponding region, the area of the corresponding region;

multiplying the area with the effective flux associated with the corresponding region to determine an effective region value; and determining the region value by multiplying the effective region value with the predicted sensitivity level associated with the region; and sum the plurality of region values to determine the BFCS value.

18. The computer readable medium of claim 17, wherein the instructions to determine the SER comprise instructions to manipulate the processor to:
  determine a flux associated with a material to be implemented in the integrated circuit device; and
  determine the SER based on the flux associated with the material and the BFCS value.

19. A system, comprising:
  a memory configured to store design information based on an integrated circuit device design and spectrum information based on an energy spectrum of one or more particles; and
  an analysis module coupled to the memory and configured to determine a soft error rate (SER) for the integrated circuit device design based on a predicted amount of charge imparted by the one or more particles to an integrated circuit device, based on a predicted sensitivity level of a first region of the integrated circuit device to charge imparted by the one or more particles, and based on a predicted critical charge level representing an amount of charge predicted to result in a change in a logic state of a data value at the first region of the integrated circuit device.

20. The device of claim 19, wherein the analysis module is configured to determine the SER based on predicted sensitivity levels for each of a plurality of regions of the integrated circuit device to charge imparted by the one or more particles.

* * * * *